US006244287B1

(12) United States Patent
Hill et al.

(10) Patent No.: US 6,244,287 B1
(45) Date of Patent: Jun. 12, 2001

(54) SYSTEM AND METHOD FOR DYNAMICALLY PURGING CARGO TANK WET LINES

(75) Inventors: Simon Hill, Cary, NC (US); Christopher J. Greenslade, Kent (GB)

(73) Assignee: Syltone Industries, LLC, Louisville, KY (US)

( * ) Notice: Subject to any disclaimer, the term of this patent is extended or adjusted under 35 U.S.C. 154(b) by 0 days.

(21) Appl. No.: 09/368,088

(22) Filed: Aug. 3, 1999

(51) Int. Cl.$^7$ .............................. B08B 5/00; B08B 9/032; B67D 5/32
(52) U.S. Cl. ..................... 137/2; 134/99.1; 134/166 C; 134/169 R; 134/171; 137/15.04; 137/240; 137/312; 137/558; 73/40.5 R; 141/91; 141/94; 141/113; 141/311 A
(58) Field of Search ................... 137/238, 240, 137/15.04, 15.05, 312, 558, 2; 73/40.5 R; 141/91, 94, 96, 113, 140, 311 A; 134/94.1, 95.1, 98.1, 99.1, 166 C, 169 R, 171

(56) References Cited

U.S. PATENT DOCUMENTS

| | | | |
|---|---|---|---|
| 5,377,715 | 1/1995 | Andenmatten et al. | 137/240 |
| 5,462,078 | 10/1995 | Andenmatten et al. | 137/240 |
| 5,515,890 | * 5/1996 | Koeninger | 141/94 |
| 5,531,240 | * 7/1996 | Kelada | 137/240 |
| 5,878,767 | * 3/1999 | Etling et al. | 137/240 |

* cited by examiner

Primary Examiner—George L. Walton
(74) Attorney, Agent, or Firm—Christopher C. Dremann

(57) ABSTRACT

A system and method ensures that the wet lines of a bottom loading petroleum cargo tank remain free of hazardous liquid during transit. The system and method continuously monitor and automatically purge liquid that collects in the wet lines during transit, for example from a leaking emergency valve. The system includes a liquid sensor positioned at a low point in the wet line, a low pressure purge controller in electrical communication with the liquid sensor and a solenoid valve in electrical communication with the purge controller. The system further includes a one-way flow valve in flow communication with the solenoid valve and the wet line. The solenoid valve is also in flow communication with an external source of compressed gas, such as the air system of the cargo tank or an auxiliary air supply. Preferably, the system further includes a remote warning indicator for indicating to the operator of the cargo tank that a particular wet line is leaking excessively. When liquid is present in the wet line, the liquid sensor transmits an electrical signal to the purge controller. The purge controller then transmits an electrical signal to open the solenoid valve, thereby permitting the flow of compressed gas through the solenoid valve and the one-way flow valve into the wet line. The compressed gas pressurizes the wet line, thereby forcing the liquid to the low point where it is directed through the purge conduit back into the cargo tank compartment.

15 Claims, 3 Drawing Sheets

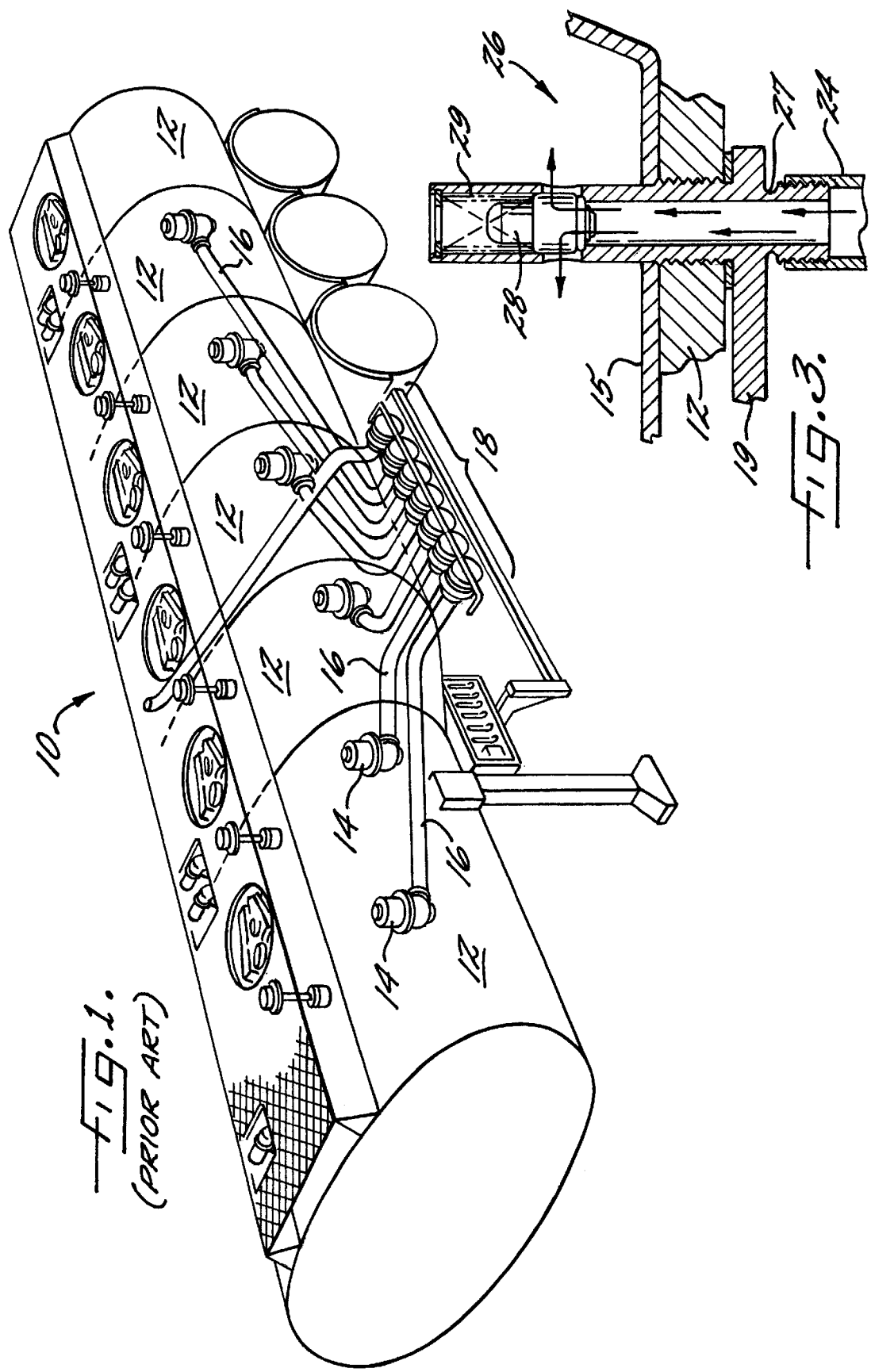

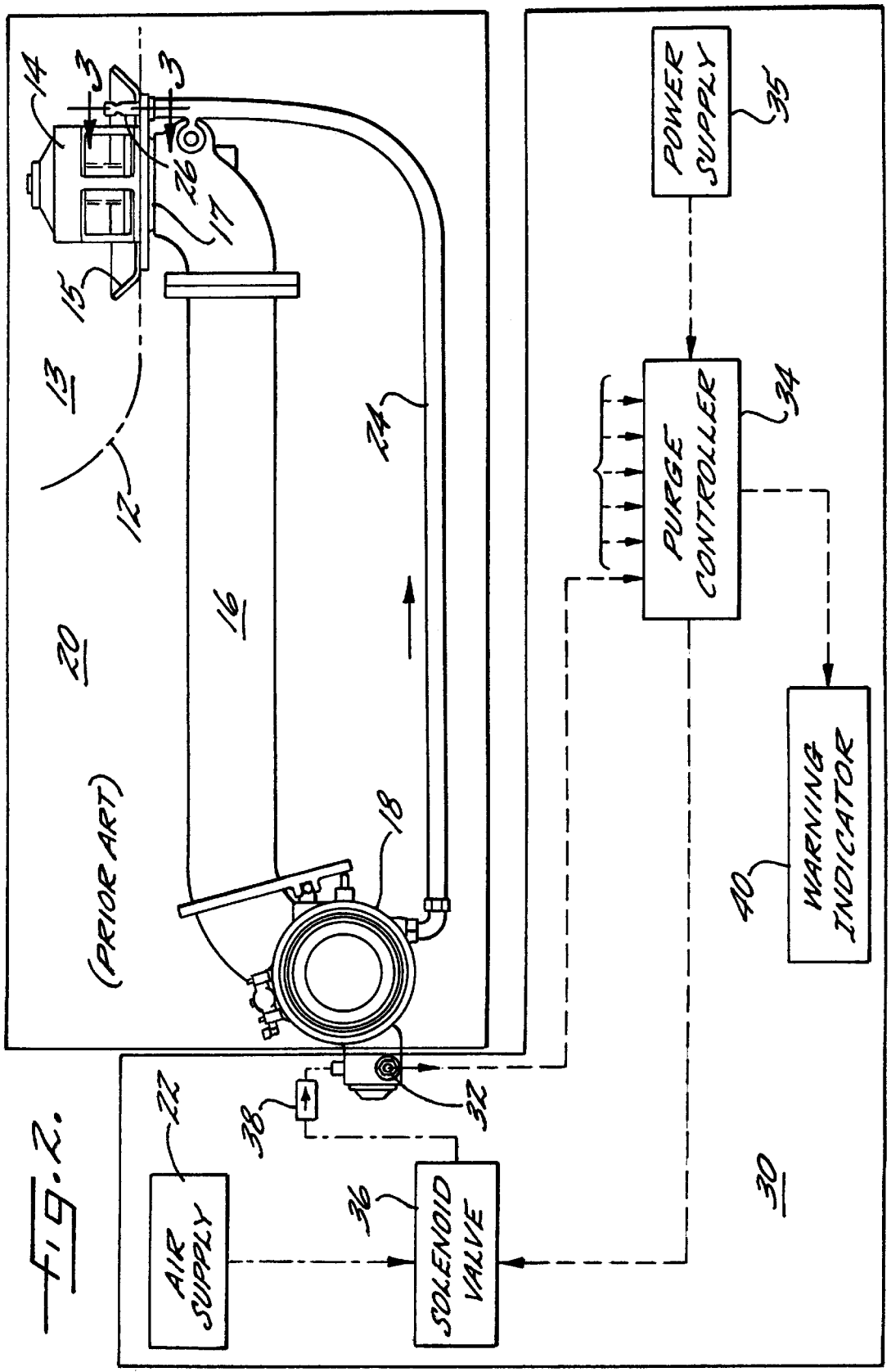

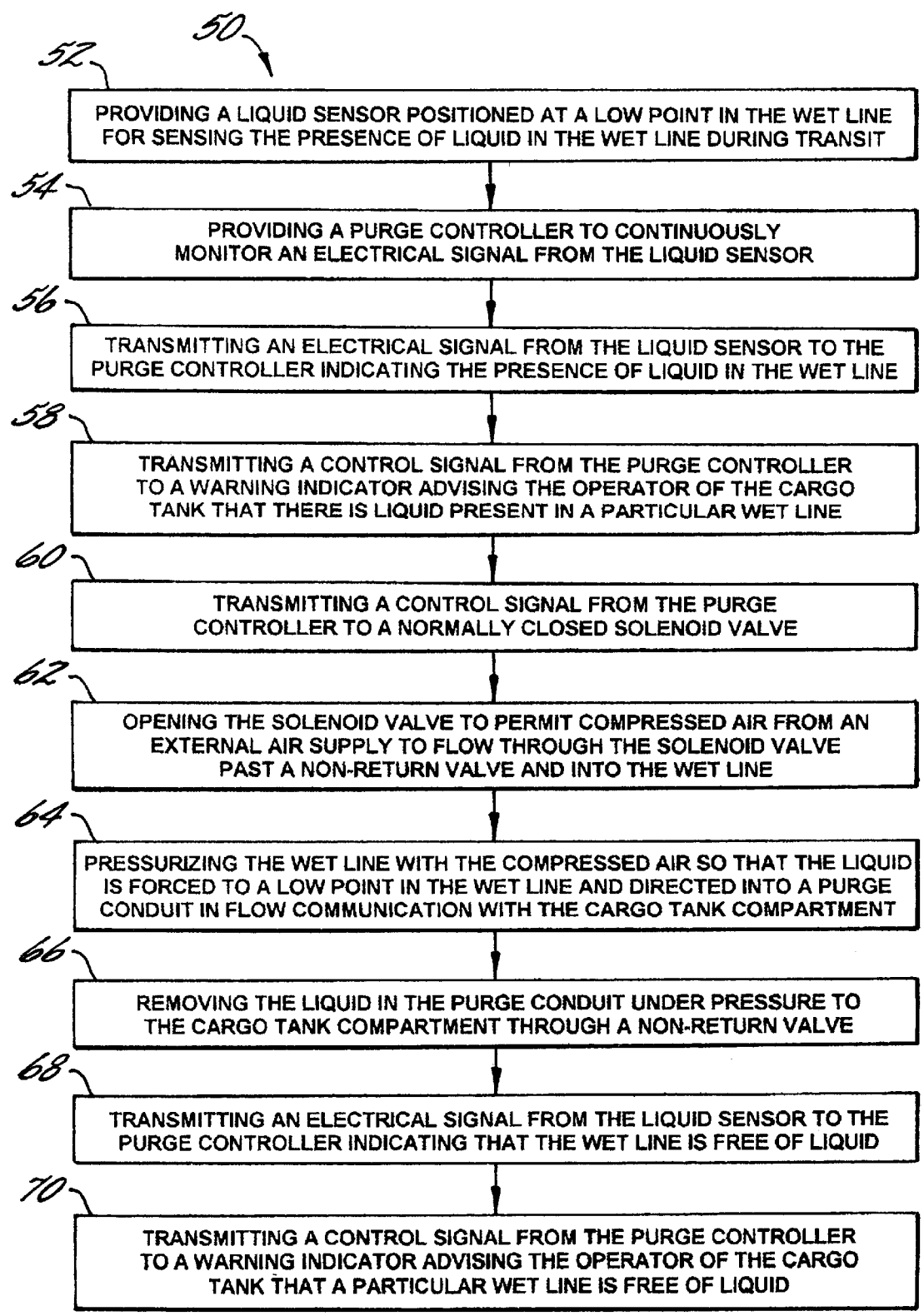

SYSTEM AND METHOD FOR DYNAMICALLY PURGING CARGO TANK WET LINES

FIELD OF THE INVENTION

The invention relates generally to cargo tank wet lines, and more particularly, to a system and method for dynamically purging hazardous liquid from a cargo tank wet line so that the liquid will not spill in the event that the wet line is damaged or broken off as a result of an accident.

BACKGROUND OF THE INVENTION

Hazardous liquids, such as chemicals and petroleum products, are primarily transported over roadways in road tanker vehicles commonly referred to as cargo tanks. In particular, a petroleum cargo tank is typically divided into a plurality of separate cargo tank compartments for transporting one or more petroleum products. The most common type of petroleum cargo tank in use today is known as a "bottom loading" cargo tank because the cargo tank compartments are loaded and unloaded from the underside, or bottom, of the cargo tank. Each cargo tank compartment in a bottom loading cargo tank is equipped with an emergency valve located at the lowest point in the compartment that is biased in the closed position by a spring. The emergency valve is opened for loading and unloading the liquid petroleum product and is closed during transit to retain the product inside the cargo tank compartment.

An external conduit, referred to herein as a "wet line," is attached at one end to the emergency valve of the cargo tank by a fluid-tight connection such that the wet line is in flow communication with the interior of the cargo tank compartment. The wet line extends outwardly from the cargo tank compartment to a convenient location on the side of the cargo tank. The other end of the wet line terminates in a fluid-tight connection with the API adapter valve of a dry disconnect coupling that is biased in the closed position by a spring. At a loading facility, the liquid petroleum product is pumped under force through the dry disconnect coupling, the wet line and the emergency valve into the cargo tank compartment. After the cargo tank compartment is loaded and the API adapter valve and the emergency valve are closed, a residual amount of the petroleum product remains in the wet line. Depending on the distance between the API adapter valve and the emergency valve of a particular cargo tank compartment, the amount of residual liquid petroleum product can be several gallons. Since the residual liquid has already been metered and there is no convenient means for removing it from the wet line, the residual liquid remains in the wet line underneath the cargo tank during transit.

Wet lines, however, are susceptible to being damaged or broken off as a result of an accident. For example, there have been reported instances in which an automobile has impacted the underside of the cargo tank and caused one or more of the wet lines to become severed from the emergency valve. For this reason, the wet line is designed to fail in an underside collision at a point outside the cargo tank compartment adjacent the emergency valve, thereby preventing the entire contents of the compartment from being emptied. When the emergency valve or wet line fails, however, the residual liquid in the wet line is spilled onto the ground underneath the cargo tank. As a result, there is significant potential for contamination of the ground, including the underground water supply, by the liquid petroleum product. One solution to this problem is proposed in U.S. Pat. Nos. 5,462,078 and 5,377,715 to Andenmatten et al. The Andenmatten et al. patents disclose an apparatus and method for eliminating hazardous materials from cargo tank wet lines. In particular, the Andenmatten et al. patents disclose an apparatus and method for purging hazardous materials from the wet lines of a petroleum cargo tank using a pressurized gas. The pressurized gas forces the residual liquid to the lowest point in the wet line where it is directed through a purging conduit back into the cargo tank compartment. The pressurized gas may be obtained from an external source, such as compressed air from the tractor or the loading facility, or may be created by pressurizing petroleum vapors collected by the cargo tank's vapor recovery system during the loading process. The Andenmatten et al. patents further disclose an initiation and shut off system for automatically purging the residual liquid petroleum product from the wet line once the cargo tank compartment is loaded and the interference gate on the side of the cargo tank is closed.

Government legislation is anticipated that will likely require all bottom loading cargo tanks within the United States to be operated in a manner that eliminates the danger of ground contamination by hazardous liquids during transit. With the present configuration of bottom loading cargo tanks, such potential legislation would require each wet line carrying hazardous liquid to be purged of residual liquid when the cargo tank departs the loading facility and while the cargo tank is in transit. Accordingly, in the event that the wet line is damaged or broken off as a result of an accident, very little, if any, hazardous liquid will be spilled onto the ground in the vicinity of the cargo tank. Therefore, the danger of ground contamination would be eliminated.

The apparatus and method disclosed in the Andenmatten et al. patents merely ensure that the wet lines are purged of residual liquid immediately following the loading process at the loading facility. Unfortunately, a great number of the emergency valves utilized to seal the cargo tank compartments of bottom loading cargo tanks are highly susceptible to leakage during transit. As a result, it is likely that one or more of the wet lines on the cargo tank will become wet during transit as the hazardous liquid leaks from the emergency valve and collects in the wet line. As such, it is still possible that a significant amount of hazardous liquid will spill in the event that one or more wet lines are damaged or broken off as a result of an accident. Accordingly, the danger of ground contamination is not entirely eliminated by the method and apparatus proposed by the Andenmatten et al. patents.

It is thus apparent that a system and method is needed for entirely eliminating the danger that hazardous liquid will be spilled during transit in the event that a wet line is damaged or broken off More particularly, it is apparent that a system and method is needed for ensuring that the wet lines of a bottom loading petroleum cargo tank remain free from hazardous liquid during transit. It is further apparent that a system and method is needed for continuously monitoring the presence of residual liquid in a wet line of a bottom loading cargo tank and for automatically purging the residual liquid from the wet line during transit. It is further apparent that a system and method is needed for indicating to the operator of a bottom loading cargo tank when the emergency valve of a cargo tank compartment is leaking hazardous liquid into a wet line.

OBJECTS OF THE INVENTION

Thus, the principal object of the present invention to provide a system and method for eliminating the danger that a bottom loading cargo tank will spill hazardous liquid during transit in the event that a wet line is damaged or broken off More particularly, the principle object of the invention is to provide a system and method for ensuring that the wet lines of a bottom loading cargo tank remain free from hazardous liquid during transit.

It is yet another object of the invention to provide a system and method for continuously monitoring the presence of residual liquid in a wet line of a bottom loading cargo tank and for automatically purging the residual liquid from the wet line during transit.

It is another object of the present invention to provide a system and method for indicating to the operator of a bottom loading cargo tank when the emergency valve of a cargo tank compartment is leaking hazardous liquid into a wet line.

SUMMARY OF THE INVENTION

The invention is a system and method for eliminating the danger that hazardous liquid that collects in an external conduit of a bottom loading cargo tank will be spilled as a result of an accident, thereby preventing contamination of the ground. More particularly, the system and method ensure that the wet lines of a bottom loading cargo tank remain free of liquid during transit in the event that an emergency valve of a cargo tank compartment leaks after loading a hazardous liquid into the compartment at a loading facility. The invention is also a system and method for continuously monitoring the presence of hazardous liquid in an external conduit and for automatically purging the liquid that collects in the external conduit during transit.

In a preferred embodiment, the system for dynamically purging liquid from an external conduit of a bottom loading cargo tank includes a liquid sensor, a source of pressurized gas, a first one-way flow valve, a purge controller and a purge conduit. The liquid sensor senses the presence of liquid in the external conduit and is preferably positioned at a low point in the external conduit. Accordingly, the liquid sensor will be activated even when only a small amount of liquid is present in the external conduit. The source of pressurized gas is in flow communication with the external conduit. The first one-way flow valve in is flow communication with the source of pressurized gas and the external conduit. When opened, the first one-way flow valve permits the flow of pressurized gas from the source of pressurized gas into the external conduit. Preferably, the first one-way flow valve is biased in the closed position to prevent the back flow of liquid and/or gas back to the source of pressurized gas.

The purge controller is in electrical communication with the liquid sensor and the first one-way flow valve. The purge controller opens the first one-way flow valve in response to an electrical signal generated by the liquid sensor when a predetermined amount of liquid is present in the external conduit. In another preferred embodiment, the system of the invention further includes a solenoid valve in electrical communication with the purge controller. The solenoid valve is also in flow communication with the source of pressurized gas and the first one-way flow valve. When opened, the solenoid valve permits the flow of pressurized gas from the source of pressurized gas to the first one-way flow valve. The solenoid valve may be any conventional solenoid valve for permitting the flow of pressurized gas. Preferably, however, the solenoid valve is a 3-2 normally closed pneumatic solenoid valve. The system of the invention may further includes a power supply in electrical communication with the purge controller and the electrical system of the cargo tank for supplying electrical power to the purge controller, as needed.

Finally, the purge conduit is in flow communication with the external conduit and a cargo tank compartment. When pressurized by the source of pressurized gas, the purge conduit returns the liquid in the external conduit to the cargo tank compartment. Preferably, the purge conduit comprises an inlet end in flow communication with the external conduit and an outlet end in flow communication with the cargo tank compartment. The inlet end of the purge conduit is positioned at a low point in the external conduit to maximize the amount of liquid purged from the external conduit. Accordingly, when the external conduit and the purge conduit are pressurized by the source of pressurized gas, essentially all of the liquid present in the external conduit will be forced through the purge conduit and into the cargo tank compartment.

In another preferred embodiment, the dynamic purge control system further includes a warning indicator in electrical communication with the purge controller for indicating at a remote location whether liquid is present in the external conduit. In another preferred embodiment, the system of the invention includes a second one-way flow valve in flow communication with the purge conduit and the cargo tank compartment. The second one-way flow valve permits the flow of liquid from the external conduit through the purge conduit and into the cargo tank compartment. Preferably, the second one-way flow valve is biased in the closed position, thereby preventing the back flow of liquid from the cargo tank compartment into the external conduit and/or the purge conduit. The external surface of the second one-way flow valve preferably has a shear groove formed therein adjacent the outside surface of the cargo tank compartment. Likewise, the external surface of an emergency valve provided between the external conduit and the cargo tank compartment preferably has a shear groove formed therein adjacent the outside surface of the cargo tank compartment. Thus, the second one-way flow valve and the emergency valve will fail in the event of an accident, thereby preventing the contents of the cargo tank compartment from spilling onto the ground.

In a preferred embodiment, the method of the invention for dynamically purging liquid from an external conduit of a bottom loading cargo tank includes the first step of providing a liquid sensor for sensing the presence of liquid in the external conduit and for transmitting a first electrical signal indicating the presence of liquid in the external conduit. The preferred embodiment of the method includes the second step of providing a purge controller in electrical communication with the liquid sensor for receiving the first electrical signal from the liquid sensor and for transmitting a first control signal. Preferably, the purge controller transmits a second control signal in response to the first electrical signal from the liquid sensor to a warning indicator at a remote location advising an operator that there is liquid present in the external conduit.

The preferred embodiment of the method includes the third step of providing a source of pressurized gas in flow communication with the external conduit. The preferred embodiment of the method includes the fourth step of providing a first one-way flow valve in flow communication with the source of pressurized gas and the external conduit. The preferred embodiment of the method includes the fifth step of opening the first one-way flow valve in response to the first control signal transmitted by the purge controller to permit the pressurized gas to flow into the external conduit. The external conduit is thereby pressurized so that the liquid is forced to a low point in the external conduit. The preferred embodiment of the method includes the sixth step of providing a purge conduit in flow communication with the external conduit and with a cargo tank compartment of the cargo tank. Preferably, the inlet end of the purge conduit is located at a low point or points in the external conduit so that the purge conduit conveys essentially all of the liquid in the pressurized external conduit into the cargo tank compartment through a second one-way flow valve.

The method of the invention may include the additional step of providing a power supply in electrical communication with the electrical system of the cargo tank and with the purge controller. The power supply transmits a second electrical signal to the purge controller indicating that the ignition of the cargo tank is on. Preferably, the first control signal transmitted by the purge controller consists of the first electrical signal transmitted by the liquid sensor and the second electrical signal transmitted by the power supply. The method of the invention may also include the additional step of providing a solenoid valve in electrical communication with the purge controller. The solenoid valve is also in flow communication with the source of pressurized gas and with the first one-way flow valve. The solenoid valve is opened in response to the first control signal transmitted by the purge controller to permit pressurized gas from the source of pressurized gas to flow through the solenoid valve and the first one-way flow valve into the external conduit. The method of the invention may also include the additional step of transmitting a third electrical signal from the liquid sensor to the purge controller indicating that the external conduit is free of liquid. The purge controller then transmits a third control signal consisting of the third electrical signal to close the first one-way flow valve after a predetermined time. The purge controller preferably also transmits a fourth control signal to a warning indicator at a remote location advising an operator that the external conduit is free of liquid.

BRIEF DESCRIPTION OF THE DRAWINGS

The aforementioned objects and others will become more readily apparent when considered in conjunction with the following detailed description and the accompanying drawings in which:

FIG. 1 is a perspective view of a conventional bottom loading petroleum cargo tank having a plurality of wet lines for loading and unloading hazardous liquid from a corresponding plurality of cargo tank compartments;

FIG. 2 is a s schematic diagram of a dynamic purge system according to the present invention for ensuring that the wet lines of the bottom loading petroleum cargo tank of FIG. 1 remain free from hazardous liquid during transit;

FIG. 3 is a detailed cross section of the non-return valve of the purge conduit of FIG. 2 taken along line 3—3 of FIG. 2; and FIG. 4 is a flow chart of a dynamic purge method according to the present invention for continuously monitoring and automatically purging the wet lines of the bottom loading petroleum cargo tank of FIG. 1.

DETAILED DESCRIPTION OF THE PREFERRED EMBODIMENTS

Terms such as "inside," "outside," "bottom," "underside" and "side" are used herein for convenience of reference only, and therefore, should not be construed as limiting the scope of the invention in any way. Referring now to the accompanying drawings in which preferred embodiments of the invention are shown and like reference numerals identify like parts in the different views, a conventional bottom loading petroleum cargo tank is indicated generally at 10 in FIG. 1. Cargo tank 10 comprises a plurality of cargo tank compartments 12 for transporting petroleum products from a loading facility over roadways to, for example, an underground storage tank at a fueling station. As shown, the cargo tank 10 comprises six separate cargo tank compartments 12. However, the cargo tank 10 may comprise any convenient number of cargo tank compartments 12 for transporting the same or different petroleum products. With minor modifications, the cargo tank 10 may also be used to transport other hazardous materials, such as liquid, gas or solid chemicals, over roadways between loading facilities and delivery destinations.

The cargo tank 10 is referred to as a "bottom loading" cargo tank because the liquid petroleum products are loaded and unloaded through the underside, or bottom, of the cargo tank. Each cargo tank compartment 12 comprises an emergency valve 14 located at the lowest point of the cargo tank compartment 12 such that the petroleum product is loaded into the compartment at the loading facility against the influence of gravity. The emergency valve 14 is biased in the normally closed position by a spring (not shown) in a known manner. The spring is compressed to open the emergency valve 14 for loading and unloading the petroleum product and is relaxed to close the emergency valve for retaining the petroleum product in the cargo tank compartment 12 during transit. After the cargo tank 10 arrives at the fueling station, the emergency valve 14 is again opened to unload the petroleum product under the influence of gravity from the cargo tank compartment 12 into the underground storage tank.

The petroleum product is loaded and unloaded through an external conduit 16. Preferably, the conduit 16 is an elongate, cylindrical hollow pipe having an internal diameter of about 4 inches. However, the internal diameter of the conduit can be larger or smaller. The conduit 16 is attached at one end to the emergency valve 14 by a fluid-tight connection so that the conduit is in flow communication with the interior of the cargo tank compartment 12. The conduit 16 extends outwardly from the cargo tank compartment 12 on the underside of the cargo tank 10 to a convenient location along the side of the cargo tank for attaching the coupler of a dry disconnect coupling to load and unload the petroleum product. The end of the conduit 16 terminates on the side of the cargo tank 10 with the API adapter valve 18 of the dry disconnect coupling. After loading the petroleum product into the cargo tank compartment 12, a residual amount of liquid petroleum product remains in the conduit 16 between the emergency valve 14 and the API adapter valve 18. The external conduit 16 is often referred to as a "wet line" because the liquid petroleum product historically has been permitted to remain in the conduit during transit.

However, the wet line 16 is vulnerable to being damaged or broken off from the emergency valve 14 or the API adapter valve 18 as a result of an accident, and in particular, as a result of vehicle impacting the underside of the cargo tank 10. Such an accident, commonly referred to as an "under-ride" accident, presents the danger that the petroleum product inside the wet line 16, typically several gallons, will be spilled onto the ground underneath the cargo tank. In fact, the wet line 16 is designed to fail first in an under-ride accident to prevent the entire contents of the cargo tank compartment 12 from being spilled. For that purpose, a shear groove 17 (FIG. 2) is typically formed in the external surface of the emergency valve 14 adjacent the outside of the cargo tank compartment 12. Accordingly, there exists the significant potential that one or more wet lines 16 will fail with the accompanying danger for contamination of the ground, including the underground water supply, by the petroleum product.

As previously mentioned, the wet lines 16 have historically been full of the petroleum product during transit. For this reason, it is currently very difficult and impractical to determine whether the emergency valve seal is sealing the cargo tank compartment 12 properly. Thus, it is only by initially purging and continually monitoring the existence or nonexistence of liquid in each wet line 16 that the proper operation of an emergency valve be verified. It is known to purge the wet lines 16 after the petroleum product has been loaded into the cargo tank compartments 12 to reduce the danger posed by an under-ride accident. Unfortunately, the elastomeric seal of the emergency valve 14 is vulnerable to aggressive attack from a variety of the hazardous liquids that are transported in the cargo tank compartment 12. As the elastomeric seal degrades over time, the influence of gravity and the difference in pressure between the cargo tank compartment 12 and the wet line 16 can cause the emergency valve 14 to leak, thereby permitting the liquid petroleum product in the compartment to drain and collect in the wet line. Accordingly, the wet line 16 must be continually monitored and purged as necessary during transit.

The enclosed portion of FIG. 2 indicated by the reference numeral 20 illustrates a conventional purge apparatus for eliminating the residual liquid in a wet line 16 of a bottom loading petroleum cargo tank 10 after the petroleum product is loaded into the cargo tank compartment 12 at the loading facility. A similar purge apparatus 20 is provided for each cargo tank compartment 12 on the cargo tank 10. When combined with the dynamic purge system of the present invention, as will be described hereafter, the purge apparatus 20 ensures that the wet line 16 is free from residual liquid when cargo tank 10 departs the loading facility and while the cargo tank is in transit to, for example, a fueling station. Preferably, the purge apparatus 20 comprises a wet line 16 extending between the emergency valve 14 of the cargo tank compartment 12 and the corresponding API adapter valve 18, as previously described. The emergency valve 14 is positioned on a sump pad 15 located within the interior cavity 13 defined by the cargo tank compartment 12 and the wet line 16 is attached to the emergency valve 14 by a fluid-tight connection such that the wet line is in flow communication with the cargo tank compartment. For the reasons previously mentioned, the wet line 16 has a shear groove 17 formed therein adjacent the outside of the cargo tank compartment 12 to facilitate failure of the wet line in the event of an under-ride accident.

Preferably, the purge apparatus 20 further comprises a source of pressurized gas 22, such as compressed air from the tractor air system, and a purge conduit 24 for returning the residual liquid in the wet line 16 to the interior cavity 13 of the cargo tank compartment 12 in the manner described in U.S. Pat. Nos. 5,462,078 and 5,377,715, the disclosures of which are incorporated herein by reference. As best shown in FIG. 3, the purge conduit 24 terminates in a non-return valve 26 adjacent the cargo tank compartment 12. The non-return valve 26 is secured to the flange 19 of the emergency valve 14 and extends through the cargo tank compartment 12 and the sump pad 15 so that the purge conduit 24 is in flow communication with the interior cavity 13 of the cargo tank compartment. Preferably, the non-return valve 26 is a conventional "one-way" or "check" valve comprising a flow plug 28 biased in the closed position by an internal compression spring 29. The non-return valve 26 further comprises a shear groove 27 adjacent the purge conduit 24 on the outside of the wall of the cargo tank compartment 12. Thus, the non-return valve 26 is designed to fail along with the emergency valve 14 in the event of an under-ride accident.

FIG. 2 further illustrates a dynamic purge system, indicated generally at 30, for eliminating the danger that the hazardous liquid petroleum product transported by the cargo tank compartment 12 will spill during transit in the event that the wet line 16 is damaged or broken off as a result of an accident. More particularly, the system 30 ensures that the wet line 16 remains free from petroleum product that drains from the emergency valve 14 of the cargo tank compartment 12 and collects in the wet line of the cargo tank 10 during transit. The system 30 comprises a liquid sensor 32, a low pressure purge controller 34, a solenoid valve 36 and a non-return valve 38. As indicated by the dashed lines in FIG. 2, the liquid sensor 32 is in electrical communication with the purge controller 34, which in turn is in electrical communication with the solenoid valve 36. As indicated by the broken lines in FIG. 2, the solenoid valve 36 is in flow communication with the air supply 22 and the non-return valve 38, which in turn is in flow communication with the wet line 16. Preferably, the system 30 is an electro-pneumatic control system. However, in some cases the control system may be entirely pneumatic.

The liquid sensor 32 is located at a low point in the wet line 16 for sensing the presence of liquid in the wet line during transit. The liquid sensor 32 may be any means for sensing the presence of liquid in the wet line 16, but preferably is an electronic light refracting prism sensor. The liquid sensor 32 transmits an electrical signal to the purge controller 34 indicating whether the wet line 16 is wet or dry, as will be described hereafter.

The purge controller 34 receives a plurality of electrical signals from a plurality of liquid sensors 32 corresponding to the number of cargo tank compartments 12, and thus wet lines 16, on the cargo tank 10. In the preferred embodiment illustrated in FIG. 2, the cargo tank 10 comprises six separate cargo tank compartments 12. However, any number of cargo tank compartments 12 is possible and the purge controller 34 receives a corresponding number of separate electrical signals from the plurality of liquid sensors 32. Preferably, the purge controller 34 is powered by an external power supply 35, such as the electrical system of the tractor. However, the purge controller may be powered by a self-contained power supply, such as an internal battery, or a separate power supply, such as a rechargeable or nonrechargeable battery located on the cargo tank 10. In turn, the purge controller 34 supplies electrical power to the liquid sensor 32 and to the solenoid valve 36, for a purpose to be described hereafter. Alternatively, the dynamic purge system 30 may be pneumatically powered and controlled using pneumatic liquid level sensors and pneumatic controls.

In a preferred embodiment, the purge controller 34 is in electrical communication with a remote warning indicator 40, preferably located in the cab of the tractor. The purge controller 34 transmits an electrical signal to the remote warning indicator 40 to alert the operator of the cargo tank 10 of the status of each wet line 16. For example, the remote warning indicator advises the operator of the cargo tank 10 if a particular liquid sensor 32 repeatedly senses the presence of liquid in the corresponding wet line 16. Such an indication may be the result of a defective liquid sensor 32 or an emergency valve 14 that is experiencing excessive leakage. In either case, the operator can readily determine the source of the problem and have it corrected so that the danger of ground contamination by the hazardous liquid during transit is eliminated.

In the event that the purge controller 34 receives an electrical signal from the liquid sensor 32 indicating there is liquid present in the corresponding wet line 16, the purge controller transmits an electrical signal to open the solenoid valve 36. The solenoid valve 36 may be any electrically operated solenoid valve, but preferably is a 3-2 normally closed pneumatic solenoid valve. Absent a second electrical signal from the purge controller 34, the solenoid valve 36 remains in the closed position, thereby preventing compressed air from the air supply 22 from flowing through the solenoid valve 36 and the non-return valve 38 into the wet line 16. In particular, the solenoid valve remains closed unless it receives a second electrical signal indicating that the ignition system of the tractor is on, and preferably that, the engine is running. Accordingly, the solenoid valve will not open unless at least two conditions are satisfied; namely that the ignition is on and there is liquid in the wet line 16. In this manner, the dynamic purge system 30 is operational from the time that the petroleum product is loaded and the cargo tank 10 commences its journey from the loading facility until the time that the cargo tank arrives at the fueling station and the engine ignition is shut-off.

If the solenoid valve 36 receives both of the required electrical signals from the purge controller 34 and the pressure of the compressed air from the air supply 22 is within the required limits, the solenoid valve opens to permit compressed air from the air supply 22 to flow through the solenoid valve to the non-return valve 38. The non-return valve 38 is a conventional "one-way" or "check" valve for preventing the back flow of pressure or liquid from the wet line 16 to the solenoid valve 36. The compressed air then flows into the wet line 16 adjacent the liquid sensor 32 at a low point in the wet line, and preferably at the lowest point in the wet line. The compressed air enters the wet line 16 at a pressure below the level required to open the emergency valve. Thus, the liquid in the wet line 16 will be forced into the cargo tank compartment 12 through the non-return valve 26 instead of the emergency valve 14.

The compressed air from the air supply 22 pressurizes the wet line 16 such that the liquid in the wet line is forced to a low point where it is directed into the purge conduit 24. Once all of the liquid has been forced out of the wet line 16 and into the purge conduit 24, the liquid sensor transmits an electrical signal to the purge controller 34 indicating that the wet line is dry. Preferably, the purge controller 34 continues to transmit the first and second electrical signals to keep the solenoid valve 36 open for an additional predetermined time. For example, the purge controller 34 may transmit the first and second electrical signals to the solenoid valve 36 for an additional 3 or 4 seconds to ensure that the liquid in the purge conduit 24 has been forced through the non-return valve 26 and back into the cargo tank compartment 12. The predetermined time should be long enough to ensure that all of the liquid has been forced out of the purge conduit 24, but should not be so long that excessive compressed air is permitted to escape through the non-return valve 26 into the cargo tank compartment 12. Thereafter, the purge controller 34 transmits an electrical signal to close the solenoid valve 36. The purge controller may also transmit an electrical signal to the remote warning indicator 40 indicating that the particular wet line 16 is free from residual liquid.

FIG. 4 illustrates a preferred method, indicated generally at 50, according to the invention for ensuring that the wet lines 16 of the bottom loading petroleum cargo tank 10 remain free from hazardous liquid during transit. The method 50 comprises the first step 52 of providing a liquid sensor 32 positioned at a low point in the wet line 16 for sensing the presence of liquid in the wet line during transit. The method 50 further comprises the second step 54 of using a purge controller 34 to continuously monitor an electrical signal from the liquid sensor 32. The method 50 further comprises the third step 56 of transmitting an electrical signal from the liquid sensor 32 to the purge controller 34 indicating the presence of residual liquid in the wet line 16. Preferably, the method further comprises the optional fourth step 58 of transmitting an electrical signal from the purge controller 34 to a remote warning indicator advising the operator of the cargo tank 10 that there is liquid present in a particular wet line 16.

The method 50 further comprises the fifth step 60 of transmitting an electrical signal from the purge controller 34 to open a normally closed solenoid valve 36. Preferably, the purge controller 34 will not transmit an electrical signal to the solenoid valve 36 until the purge controller has received at least two different electrical signals. Preferably, the two electrical signals comprise a first electrical signal from the power supply 35 indicating that the ignition system of the cargo tank 10 is on and a second electrical signal from the liquid sensor 32 indicating that liquid is present in the wet line 16. The method 50 further comprises the sixth step 62 of permitting compressed air from an external air supply 22 to flow through the solenoid valve 36 past a non-return valve 38 and into the wet line 16.

The method 50 further comprises the seventh step 64 of pressurizing the wet line 16 with the compressed air from the external air supply 22 so that the liquid is forced to a low point in the wet line and directed into a purge conduit 24 in flow communication with the cargo tank compartment 12 of the cargo tank 10. The method 50 further comprises the eighth step 66 of removing the liquid in the purge conduit 24 under pressure to the interior cavity 13 defined by the cargo tank compartment 12 through a non-return valve 26. The method 50 further comprises the ninth and final step of transmitting an electrical signal to the purge controller 34 indicating that the wet line 16 is free from liquid.

As is now apparent, the system and method of the present invention ensure that the wet lines of a bottom loading cargo tank remain free of hazardous liquid during transit. In particular, the system and method of the present invention continuously monitor and automatically purge residual liquid that collects in the wet lines of the cargo tank during transit. In addition, the system and method of the present invention indicates to the operator of a bottom loading cargo tank when a wet line is being purged repeatedly or continuously, thereby warning the operator that an emergency valve is leaking or that a liquid sensor is malfunctioning. Accordingly, the operator can investigate the source of the problem and take the appropriate action to correct the situation. Obviously, various modifications and changes to the preferred embodiments of the invention described herein will be apparent to those of skill in the art without altering the spirit or scope of the invention. It is therefore intended that the system and method of the present invention be construed as broadly as possible within the meaning of the description provided herein, as illustrated by the accompanying drawings, and the claims appended hereto, to encompass any and all such changes and modifications.

That which is claimed is:

1. A system for purging liquid from an external conduit of a bottom loading cargo tank after loading and for returning liquid that collects in the external conduit during transit to a cargo tank compartment of the cargo tank, said system comprising:

a liquid sensor positioned at a low point in the external conduit for sensing the presence of liquid in the external conduit;

a purge conduit in flow communication with the external conduit and the cargo tank compartment;

a source of pressurized gas in flow communication with the external conduit and the purge conduit;

a flow control valve in flow communication with said source of pressurized gas for permitting the flow of pressurized gas from said source of pressurized gas into the external conduit and the purge conduit said flow control valve biased in the closed position; and a purge controller in electrical communication with said liquid sensor and said flow control valve for opening said flow control valve in response to an electrical signal generated by said liquid sensor when a predetermined amount of liquid is present in the external conduit;

wherein said flow control valve opens to permit pressurized gas from said source of pressurized gas to flow into the external conduit and the purge conduit and thereby force the liquid present in the external conduit and the purge conduit into the cargo tank compartment of the cargo tank until substantially all of the liquid is removed from the external conduit and the purge conduit.

2. The system of claim 1 further comprising a warning indicator in electrical communication with said purge controller for indicating that liquid is present in the external conduit.

3. The system of claim 1 wherein said purge conduit comprises an inlet end in flow communication with the external conduit and an outlet end in flow communication with the cargo tank compartment and wherein said inlet end of said purge conduit is positioned at a low point in the external conduit to maximize the amount of liquid purged from the external conduit.

4. The system of claim 3 further comprising:

a one-way flow valve in flow communication with said purge conduit and the cargo tank compartment for permitting the flow of liquid from the external conduit through said purge conduit and into the cargo tank compartment, said flow valve biased in the closed position, the external surface of said flow valve having a shear groove formed therein adjacent the cargo tank compartment; and wherein the external surface of the external conduit has a shear groove formed therein adjacent the cargo tank compartment.

5. The system of claim 1 wherein said flow control valve comprises a 3-2 normally closed pneumatic solenoid valve.

6. The system of claim 1 further comprising a power supply in electrical communication with said purge controller.

7. A system for continuously monitoring and purging residual liquid from an external conduit of a bottom loading cargo tank and liquid that drains through an emergency valve from a cargo tank compartment and collects in the external conduit during transit, said system comprising a liquid sensor for sensing the presence of liquid in the external conduit, said liquid sensor positioned at a low point in the external conduit;

a purge conduit in flow communication with the external conduit and the cargo tank compartment;

a source of pressurized gas in flow communication with the external conduit and the purge conduit;

a solenoid valve in flow communication with said source of pressurized gas;

a first one-way flow valve in flow communication with said solenoid valve and the external conduit for permitting the flow of pressurized gas from said source of pressurized gas through said solenoid valve into the external conduit and the purge conduit, said first flow valve biased in the closed position;

a purge controller in electrical communication with said liquid sensor and said solenoid valve for opening said solenoid valve in response to an electrical signal generated by said liquid sensor when a predetermined amount of liquid is present in the external conduit;

a second one-way flow valve in flow communication with said purge conduit and the cargo tank compartment, said second flow valve biased in the closed position and opening in response to pressurized gas from said source of pressurized gas to permit the liquid present in the external conduit and the purge conduit to be forced into the cargo tank compartment;

a power supply in electrical communication with said purge controller; and a warning indicator in electrical communication with said purge controller for indicating to an operator that liquid is present in the external conduit;

wherein said solenoid valve opens to permit pressurized gas from said source of pressurized gas to flow into the external conduit and the purge conduit and thereby force the liquid present in the external conduit and the purge conduit into the cargo tank compartment of the cargo tank until substantially all of the liquid is removed from the external conduit and the purge conduit.

8. A method for purging liquid from an external conduit of a bottom loading cargo tank after loading and for returning liquid that collects in the external conduit during transit to a cargo tank compartment of the cargo tank, said method comprising the steps of:

(a) providing a liquid sensor for sensing the presence of liquid at a low point in the external conduit and for transmitting a first electrical signal indicating the presence of liquid in the external conduit;

(b) providing a purge conduit in flow communication with the external conduit and with a cargo tank compartment of the cargo tank for removing the liquid in the external conduit into the cargo tank compartment;

(c) providing a purge controller in electrical communication with the liquid sensor for receiving the first electrical signal from the liquid sensor and for transmitting a first control signal;

(d) providing a source of pressurized gas in flow communication with the external conduit and the purge conduit;

(e) providing a flow control valve in flow communication with the source of pressurized gas and the external conduit;

(f) opening the flow control valve in response to the first control signal transmitted by the purge controller to permit the pressurized gas to flow into the external conduit, thereby pressurizing the external conduit and the purge conduit so that the liquid is forced into the cargo tank compartment until substantially all of the liquid is removed from the external conduit and the purge conduit.

9. The method of claim 8 comprising the further step of
(c1) transmitting a second control signal to a warning indicator advising an operator that there is liquid present in the external conduit.

10. The method of claim 9 comprising the further step of
(a1) providing a power supply in electrical communication with the purge controller for transmitting a second electrical signal indicating that the ignition of the cargo tank is on.

11. The method of claim 10 wherein the first control signal transmitted by the purge controller comprises the first electrical signal transmitted by the liquid sensor and the second electrical signal transmitted by the power supply.

12. The method of claim 10 comprising the further steps of:
(g) transmitting a third electrical signal from the liquid sensor to the purge controller indicating that substantially all of the liquid is removed from the external conduit;
(h) transmitting a third control signal from the purge controller comprising the third electrical signal; and
(i) closing the flow control valve after a predetermined time in response to the third control signal transmitted by the purge controller.

13. The method of claim 12 comprising the further step of
(c1) transmitting a fourth control signal from the purge controller to a warning indicator advising an operator that substantially all of the liquid is removed from the external conduit.

14. A method of continuously monitoring and purging liquid that drains through an emergency valve from a cargo tank compartment and collects in the external conduit during transit, said method comprising the steps of:
(a) providing a liquid sensor for sensing the presence of at least a predetermined amount of liquid at a low point in the external conduit and for transmitting a first electrical signal indicating the presence of liquid in the external conduit;
(b) providing a power supply in electrical communication with the electrical system of the cargo tank for transmitting a second electrical signal indicating that the ignition of the cargo tank is on;
(c) providing a purge controller in electrical communication with the liquid sensor and the power supply for receiving the first electrical signal from the liquid sensor and the second electrical signal from the power supply and for transmitting a first control signal comprising the first electrical signal and the second electrical signal and a second control signal advising an operator that the predetermined amount of liquid is present in the external conduit;
(d) providing a purge conduit in flow communication with the external conduit and with a cargo tank compartment of the cargo tank for removing the liquid in the pressurized external conduit into the cargo tank compartment;
(e) providing a source of pressurized gas in flow communication with the external conduit and the purge conduit;
(f) providing a solenoid valve in electrical communication with the purge controller and in flow communication with the source of pressurized gas for receiving the first control signal transmitted by the purge controller;
(g) opening the solenoid valve in response to the first control signal transmitted by the purge controller to permit the pressurized gas to flow through the solenoid valve into the external conduit, thereby pressurizing the external conduit and the purge conduit so that the liquid in the external conduit is forced into the cargo tank compartment until substantially all of the liquid is removed from the external conduit and the purge conduit.

15. The method of claim 14 comprising the further steps of:
(h) transmitting a third electrical signal from the liquid sensor to the purge controller indicating that substantially all of the liquid is removed from the external conduit;
(i) transmitting a third control signal from the purge controller comprising the third electrical signal advising the operator that substantially all of the liquid is removed from the external conduit; and
(j) closing the solenoid valve in response to the third control signal transmitted by the purge controller after a predetermined time.

* * * * *